United States Patent Office 3,357,946
Patented Dec. 12, 1967

3,357,946
POLYMERIC OLEFIN COMPOSITIONS STABILIZED WITH A THIODIALKANOIC ACID ESTER AND A TRIHYDROXYARYL HYDROCARBON
Robin Henry Burgess, Market Drayton, England, assignor to Imperial Chemical Industries Limited, London, England, a corporation of Great Britain
No Drawing. Filed June 28, 1965, Ser. No. 467,742
Claims priority, application Great Britain, July 29, 1959, 25,999/59; Aug. 12, 1959, 27,567/59
10 Claims. (Cl. 260—45.85)

This is a continuation-in-part of my application Serial No. 44,278, filed July 21, 1960, now abandoned. The invention relates to improved compositions. It is well known that it is desirable to incorporate antioxidants into rubber and solid polymers and copolymers of aliphatic unsaturated hydrocarbons, e.g. polythene (the solid polymers of ethylene), solid polymers of aliphatic mono-alpha-olefins having at least three carbon atoms, for instance polypropylene, polybutene-1, poly-3-methyl-butene-1, poly-4-methyl-pentene-1 and particularly the isotactic polymers thereof, polyisobutylene and the polymers and copolymers of butadiene and isoprene. These polymers, hereinafter and in the appended claims, will be referred to as solid olefin polymers. By solid isotactic aliphatic mono-alpha-olefin polymers I mean solid aliphatic mono-alpha-olefin polymers not less than 75% of which are insoluble in heptane.

Most of the known antioxidants cause staining of these polymeric materials, particularly after compositions containing them have been subjected to heat and light ageing.

Certain phenolic compounds have been proposed as non-staining antioxidants, but it has generally been found that they are less effective than the aromatic amine antioxidants, and these latter are, therefore, frequently preferred in spite of the drawbacks usually associated with their staining character.

It is an object of the present invention to provide new stabilizer compositions which render solid olefin polymers as hereinafter defined outstandingly resistant to oxidation and in preferred embodiments give compositions with the said olefin polymers which show a remarkably low tendency to staining.

It is a further object of the present invention to provide new polymeric compositions which are usefully stabilized with the said stabilizer compositions.

I have found that there is a class of phenolic compounds containing at least two phenolic nuclei which shows an astonishing synergism with certain sulfur compounds which are diesters or hydrocarbon-substituted diamides of thiodialkanoic acids, in that a mixture of a phenolic compound chosen from the said class with one of the said sulfur compounds protects solid olefin polymers as hereinbefore defined against embrittlement or exposure to elevated temperatures to a far greater degree than could have been predicted from the performance of the phenolic compound or the sulfur compound alone.

According to the present invention I now provide a stabilizer composition comprising a thio-compound selected from the class consisting of diesters and N,N'-di- and N,N',N'-tetrahydrocarbon substituted diamides of a thiodialkanoic acid, and a phenolic compound having the formula

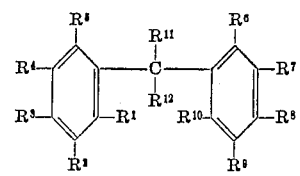

in which at least one of $R^1$, $R^3$ and $R^5$ and at least one of $R^6$, $R^8$ and $R^{10}$ is a hydroxyl group, the remaining nuclear substituents being selected from the class consisting of hydrocarbon, hydroxyl, and alkoxyl groups, and hydrogen atoms, not more than two hydroxyl groups being attached to each nucleus, and in which $R^{11}$ and $R^{12}$ together contain at least six carbon atoms, and comprise at least one hydroxyaryl group, and are selected from the class consisting of hydrocarbon groups, hydroxyaryl groups and hydrocarbon and oxacycloalkyl groups having as a substituent a hydroxyaryl group, and hydrogen atoms.

In a preferred form of the invention the stabilizer composition comprises a diester of beta-thiodipropionic acid and a phenolic compound which is the product of reaction of at least two molecules of a phenol substituted by a hydrocarbon group in an ortho or para position, preferably a phenol substituted in an ortho position and having a para position free, and one molecule of an unsaturated aldehyde or ketone.

In this latter form I often find that more than two molecules of the phenol are combined with one molecule of the unsaturated aldehyde or ketone, the phenol molecules in excess of two being added across the double bond or bonds of the unsaturated aldehyde or ketone. Condensates of 3-methyl-6-tertiary butyl phenol with acrolein, crotonaldehyde, and cinnamaldehyde and of 2,6-xylenol with crotonaldehyde have been analyzed and found to have this structure. Accordingly as the unsaturated aldehyde or ketone is monomeric (e.g. crotonaldehyde, cinnamaldehyde) or, as in the case of, for instance, crotonaldehyde dimer and methacrolein dimer, is a heterocyclic dimer, the phenolic compound will contain respectively hydroxyaryl-substituted hydrocarbon groups or hydroxyaryl-substituted oxacycloalkyl groups.

Copending U.S. application No. 44,547, filed July 22, 1960, now U.S. Patent 3,196,185 describes and claims certain of these phenolic compounds as new materials, and also a process for their production.

I find that those condensates in which three or more molecules of a phenol are combined with one molecule of an unsaturated aldehyde or ketone are particularly effective in the compositions of my invention. Accordingly, in a preferred form, my invention provides a stabilizer composition comprising a diester of a thiodialkanoic acid selected from the class consisting of beta-thiodipropionic and gamma-thiodibutyric acids and a phenolic compound in which $R^3$ and $R^8$ are hydroxyl groups and $R^2$ and $R^7$ are alkyl groups, the remaining nuclear substituents being selected from the class consisting of hydrocarbon groups and hydrogen atoms, the hydrocarbon substituents in each phenolic nucleus together containing not more than twleve carbon atoms, and in which $R^{11}$ is selected from the class consisting of hydroxyaryl groups, alkyl, aralkyl, and oxacycloalkyl groups having as a substituent a hydroxyaryl group, hydrocarbon groups and hydrogen atoms, and $R^{12}$ is selected from the class consisting of hydroxyaryl groups and alkyl, aralkyl and oxacycloalkyl groups having as a substituent a hydroxyaryl group.

I prefer that the said hydroxyaryl groups are p-hydroxy mono-nuclear aryl groups.

I prefer that the phenolic nuclei and any hydroxyaryl groups $R^{11}$ and $R^{12}$ or any hydroxyaryl residues in groups $R^{11}$ and $R^{12}$ should be substituted, and the substituents in the said hydroxyaryl groups or residues are very conveniently the same as in the said phenolic nuclei.

For reasons of convenience and economy, and because of the lower level of staining thus obtained, I prefer that the substituents are hydrocarbon groups, particularly alkyl groups. Bulky alkyl groups, e.g. tertiary butyl and tertiary octyl (i.e. $\alpha,\alpha,\gamma,\gamma$-tetramethyl butyl) groups at positions $R^2$ and $R^7$ are especially suitable. However, other hydrocarbon groups, for example alpha-phenethyl, alpha-phenyl-isopropyl, or 1-methylcyclohexyl groups may also be present, and may if desired be introduced into a phenolic compound after its formation e.g. by the process of British Patent No. 698,463.

I prefer that the substituents do not together contribute more than twelve carbon atoms to each phenolic nucleus, as phenolic compounds having more than twelve carbon atoms attached to each nucleus are not more useful but merely more expensive.

If in the phenolic compounds $R^3$ and $R^8$ are hydroxyl and $R^2$ and $R^7$ are alkyl, particularly effective compositions are obtained.

The present invention also provides compositions of a solid olefin polymer, particularly polyethylene and isotactic polypropylene, usefully stabilized with the above compositions.

If $R^{11}$ and $R^{12}$ are selected from alkyl groups, hydroxyaryl groups, hydroxyaryl-substituted hydrocarbon groups, hydroxyaryl-substituted oxacycloalkyl groups and hydrogen atoms and the phenolic nuclei as well as any hydroxyaryl groups or residues are substituted by either a large group at $R^2$ and $R^7$ for example a tertiary butyl or $\alpha,\alpha,\gamma,\gamma$-tetramethyl butyl group with if desired a smaller group at $R^5$ and $R^{10}$, or by alkyl groups at $R^2$, $R^4$, $R^7$ and $R^9$ compositions are obtained which are extremely effective and have a very low tendency to stain.

I find that the products of reaction of at least two molecules of a 2,6- or a 3,6-dialkyl phenol with one molecule of acrolein, methacrolein, crotonaldehyde, cinnamaldehyde or 1-methyl cyclohexene-4-al are outstanding in this regard.

The phenolic compounds of the stabilizer compositions of this invention may, for example, be prepared (a) by condensing an aldehyde or ketone having an organic group or groups containing at least six carbon atoms attached to its carboxyl group with a phenol under conditions in which one molecule of aldehyde or ketone condenses with two molecules of phenol, or (b) by condensing an unsaturated aldehyde or ketone with a phenol under conditions such that one molecule of aldehyde or ketone condenses with at least two molecules of phenol.

Conditions for condensation (a) are in general well known in the art, and are normally effected by condensing at a temperature and for a time depending on the reactivity of the constituents in the presence of a strong acid, e.g. in the presence of hydrochloric acid, which may be provided either as a solution or as a gas. (See "The Chemistry of Phenolic Resins" by Robert W. Martin, published by John Wiley and Sons Inc. in 1956, particularly chapter 3.)

It is often desirable to use a solvent for the phenol and the aldehyde or ketone, preferably a solvent in which the product of reaction is only sparingly soluble. It is particularly desirable, to use a solvent if the phenol, aldehyde or ketone, and acid catalyst do not form a homogeneous mixture. See for example U.S. Patent 2,831,897 and copending U.S. patent application No. 44,547, filed July 22, 1960, reference to which may be made (as also to Niederl and McCoy, JACS, 63, p. 1731 (1941), McGreal, JACS, 61, p. 345 (1939)) for the carrying out of condensation (b).

While the preparation of the phenolic compounds forms no part of what I claim it should be pointed out that alpha beta unsaturated aldehydes and ketones having alkyl substituents on both the alpha and beta carbon atoms, for example 2-ethyl-hex-2-enal and 2-ethyl crotonaldehyde are often either unstable in the presence of hydrochloric acid and break down to give simpler products or else react so slowly that yields are very unsatisfactory. Thus from 2-ethyl-hex-2-enal the reaction products isolated are mainly those derived from butyraldehyde and are, therefore, outside the scope of my invention.

In such cases acid catalysis cannot be relied upon, and other methods of effecting the condensation must be attempted.

It should also be pointed out that some of my phenolic compounds for example, the condensates of acrolein and 2,6-xylenol or crotonaldehyde and 3-methyl-6-tertiary butyl phenol crystallize readily with solvent of crystallization; this sometimes makes analysis difficult, and if the solvent is for example acetic acid affects the compatibility of the phenolic compound with the olefin polymer and reduces its effectiveness.

In some cases a crystalline compound is obtained which is the desired product. In most cases, however, a gum or glass is obtained which is then subjected to vacuum distillation, the residue and occasionally the less volatile fractions being taken for antioxidant testing. In the condensation of 3-methyl-6-tertiary butyl phenol with methyl vinyl ketone, for example, a crystalline product is obtained as a distillate which is of only rather low activity although the residual gum is of high activity.

The composition of the crystalline product in this case corresponds to a 1:1 condensation of the phenol with the ketone and the compound probably has the structure

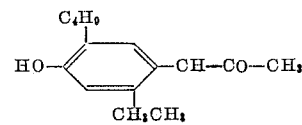

or

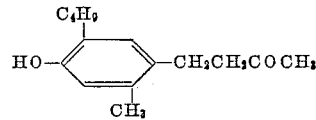

As will be seen from the individual preparations, the distillations were not all carried out under precisely the same conditions, but as a convenient generalization it may be said that the boiling point of the phenolic compound should not be less than about 200° C. at a pressure of 1 mm. of mercury. Phenolic compounds having a boiling point appreciably less than this are too volatile to be useful in compositions which are required to withstand very high temperatures on processing or in subsequent use.

A particularly convenient way of obtaining phenolic compounds of high molecular weight and, therefore, low volatility is to react three or more molecules of a substituted phenol, particularly a 2,6- or a 3,6-dialkyl phenol with one molecule of an unsaturated aldehyde or ketone.

In this way a phenolic compound is obtained in which at least one of $R^{11}$ and $R^{12}$ is a group containing at least nine carbon atoms.

In the case of the condensate from 3-methyl-6-tertiary butyl phenol and crotonaldehyde, for example, $R^{11}$ contains fourteen carbon atoms. To introduce such a large group directly would be a more tedious procedure, and the condensates from unsaturated aldehydes and ketones have the advantage that an extra phenolic group is provided.

While I have described convenient methods for the preparation of our phenolic compounds, and give later further details of several individual preparations, some alternative methods will be immediately apparent to those skilled in the art, for example, the use of mercapto-compounds or certain metal halides or ion-exchange resins as catalysts, or the use of an aldehyde or ketone having a hydroxyaryl-substituted hydrocarbon group attached to its carboxyl group in place of an unsaturated aldehyde or ketone.

Suitable phenols are, for example, those phenols (which are preferred) which have a para position free, for instance, phenol itself, guaiacol, catechol, o-phenyl phenol, o-alpha-phenethyl phenol, o-alpha-methylcyclohexyl phenol, o-(alpha-phenyl isopropyl) phenol and especially the o-alkyl phenols for instance, o-cresol, o-ethyl phenol, o-propyl and isopropyl phenols, o-butyl phenols, particularly o-tertiary butyl phenol, o-amyl phenols, o-hexyl phenols, o-heptyl phenols, o-octyl phenols, particularly tertiary octyl phenol, i.e. $\alpha,\alpha,\gamma,\gamma$-tetramethyl butyl phenol, o-nonyl phenols, o-decyl phenols, o-undecyl phenols, o-dodecyl phenols, phenols substituted in an orthor-position as above and also in a second ortho or in the opposite meta position, for instance 2,6-xylenol, 2-methyl-6-tertiary butylphenol, 2,6-ditertiary butyl phenol, 3-methyl-6-tertiary butyl phenol, 3-methyl-6-tertiary octyl phenol, 3-methoxy-6-tertiary butyl phenol, 3-ethyl-6-tertiary octyl phenol, 3 - methyl - 6 - nonyl phenol, 3 - methyl - 6-alpha-methyl-cyclohexyl phenol, 3-ethyl-6-alpha phenethyl phenol, 3-methyl-(alpha-phenyl isopropyl) phenol, 3-methoxy-6-phenyl phenol; phenols having the para position blocked by any of the above groups, for example p-cresol, p-tertiary butyl phenol, p-tertiary octyl phenol, p-nonyl phenol, 2,4-xylenol, 2,4-ditertiary butyl phenol, 2-tertiary butyl-4-methyl phenol, 2-isopropyl-4-methyl phenol and 2 octyl-4-methoxy phenol may also be used but are not preferred since they cannot give on condensation with an aldehyde or ketone my preferred phenolic compounds in which $R^3$ and $R^8$ are hydroxyl groups.

In the above list of phenols the higher alkyl phenols such as heptyl, octyl, nonyl, decyl, undecyl and dodecyl phenols are for the most part available as technical-grade commercial products in which the alkyl groups are formed by the dimerization, trimerization and co-dimerization of for example, propylene, isobutylene and pentenes. Thus propylene trimer is a source of nonyl groups, and isobutylene dimer of octyl groups.

Suitable aldehydes and ketones are for example, p-hydroxybenzaldehyde, 3,5-dimethyl-4-hydroxy benzaldehyde, 2-methyl-4-hydroxy-5-tertiary butyl acetophenone, acrolein, crotonaldehyde, methacrolein, methyl vinyl ketone, pent-2-enal, mesityl oxide, cyclohexenone, methyl cyclohexenone, 1-methyl-cyclohexene-4-al, methacrolein dimer, crotonaldehyde dimer, cinnamaldehyde, benzalacetone, citral, 3-tertiary-butyl-4-hydroxy-cinnamaldehyde, dibenzalacetone. Other aldehydes and ketones may be used but for reasons of economy and for the greatest ease of preparation of the phenolic compounds it is preferred to use aldehydes and ketones containing not more than about twenty carbon atoms.

While most of my phenolic compounds, which I prefer, are excellent in their resistance to staining and are, therefore, suitable for use in light coloured goods, there are some which stain but nevertheless give most valuable stabilizer compositions, for example, the p-hydroxy benzaldehyde/3-methyl-6-tertiary butyl phenol condensate. Such phenolic compounds are, of course, perfectly satisfactory for use in dark-coloured goods, for instance in carbon black-filled compositions.

While I find that useful stabilized compositions may be obtained with widely varied ratios of said diester or N,N'-di- or N,N,N',N'-tetra-hydrocarbon-substituted diamide of a thio-dialkanoic acid to said phenolic compound, and while my invention is in no way limited to particular ratios of these ingredients, I find that particularly effective ratios of these ingredients are when there are from 1 to 10 hydroxyl groups provided to the composition by the phenolic compound to each sulfur atom provided to the composition by said thiodialkanoic acid derivatives.

The content of these components in these compositions may also be varied over very wide limits. Thus, polyethylene compositions useful for a wide variety of applications, e.g. for making films are effectively stabilized with, for example 40 parts or even only 10 or 20 parts by weight per million of the phenolic compound with an appropriate added amount of the thiodialkanoic acid derivative. For polyethylene compositions which are to be subjected to vigorous conditions of oxidation during their processing or during their later use larger amounts of these additives would be used. In general with polyethylene, it is not necessary to use more than 0.5% by weight of the phenolic compound and normally not more than 0.1% by weight of the phenolic compound, appropriate quantities of the thiodialkanoic acid derivative being used in conjunction with this phenolic compound. For compositions of polypropylene, rubber or polymers or copolymers of conjugated dienes larger amounts again of the components are usefully used. It is seldom necessary to use more than 5% of the phenolic compound together with the thiodialkanoic acid derivative and, in general, between 0.2 and 1% for instance 0.5% of the phenolic compound together with an appropriate amount of the thiodialkanoic acid derivative is sufficient. For making films, even less, for example 500 parts by weight per million of the phenolic compound may be used.

Any diester or N,N'-di- or N,N,N',N'-tetra-hydrocarbon-substituted diamide of a thiodialkanoic acid may be used in the compositions of this invention. I find, however, that particularly satisfactory compositions are obtained when the esters are used, particularly esters of aliphatic alcohols, especially those of aliphatic alcohols of 10 to 20 carbon atoms, e.g. those of lauryl or stearyl alcohol.

Other esters which may be used but are not preferred are for example the benzyl, cyclohexyl, isooctyl and cinnamyl esters.

Of the thiodialkanoic acids, I may mention for example thiodiglycollic acid, and particularly beta-thiodipropionic acid for its combination of cheapness and effectiveness. Gamma-thiodibutyric acid is sometimes even more effective than beta-thiodipropionic acid, but is not so cheap.

While as I have stated I do not prefer the N,N'-di- or N,N,N',N',-tetra-hydrocarbon-substituted diamides I have found that N,N'-dilauryl thiodipropionamide was rather more effective than the isomeric N,N,N',N'-tertahexyl thiodipropionamide.

The compositions of this invention may be prepared in a variety of ways depending upon the manner in which the ploymeric material is obtained and the amount of stabilizing material to be incorporated in the compositions. If only a small amount of antioxidant (e.g. 40 parts per million of each component) is to be incorporated into polyethylene made by the high pressure process, the stabilizing components are suitably dissolved in a high boiling fluid hydrocarbon liquid and this solution is mixed with the hot polythene in a suitable container after the polyethylene issues from the converter in which it is produced. Larger quantities of the stabilizing components may be mixed with polyethylene or any polymeric material by any of the mastication processes. A satisfactory method for mixing the stabilizing ingredients with, for example polyethylene or polypropylene, made by the low pressure process is to add a solution of the components to polyethylene powder obtained by this process and then to remove the solvent for the stabilizing components by evaporation. The stabilizing ingredients of this invention may be mixed with latices of rubber or the polymers or copolymers of conjugated dienes by forming dispersions of them in water, mixing these dispersions with the latices to be stabilized and, if desired, coagulating or drying the latex compositions.

The compositions of this invention may also contain other stabilizers such as materials which absorb ultraviolet light. They may also contain further ancillary ingredients such as processing aids, for example, the soaps of calcium and zinc, and also such materials as pigments, dyes and fillers, and when necessary the other ingredients compounded with rubbers, e.g. vulcanizing ingredients. Thus carbon black may be incorporated either as an absorber of ultra violet light or as a pigment.

The following experimental details illustrate my invention. It will be understood however that our invention is in no way limited by these details.

Condensation products were made from various phenols with various aldehydes and ketones as follows:

(1) *According to the method of U.S.P. 2,831,897*

(a) 3-methyl-6-tertiary butyl phenol (82 g., 0.5 mole) methanol (50 g.) and concentrated hydrochloric acid (21 g.) were mixed together, heated to gentle reflux and stirred. To the mixture was added 51 g. of acrolein, slowly, over a period of 30 minutes, after which the vessel was heated and stirred for a further hour. Water was then added and the reaction mixture was washed several times by adding distilled water to the vessel, heating it until the reaction gum was soft and then vigorously stirring for 5 minutes. The vessel was then cooled and the water decanted off. The gum was finally placed on the steam bath under reduced pressure to remove the water. On cooling the gum became solid.

(b) 3-methyl-6-tertiary butyl phenol (82 g., 0.5 mole), methanol (50 g.) and concentrated hydrochloric acid (21 g.) were placed in a 500 ml. flask, stirred and brought to a gentle reflux. Methacrolein (19.3 g., 0.275 mole), was added drop-wise over 30 minutes. The reaction was continued for a further hour and the reaction mixture was vigorously stirred with hot distilled water to remove the acid. The solid that was left was dried over concentrated sulfuric acid under reduced pressure at room temperature. A good yield of solid was obtained.

(c) Methacrolein dimer

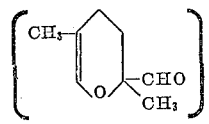

(28 g., 0.2 mole), was reacted with 3-methyl-6-tertiary butyl phenol (65.6 g., 0.4 mole) in the presence of methanol (20 g.) and concentrated hydrochloric acid (9 g.) under gentle reflux. The reaction mixture was washed with water (benzene having been added to aid separation), until it was only slightly acid to litmus, then with dilute sodium carbonate solution and finally water again. The benzene layer was dried with anhydrous sodium sulfate and after filtration, the benzene was removed by evaporation on the steam bath. This left a very dark green gum which was distilled under reduced pressure (108–118° C./85 mm.) to remove unreacted starting materials.

(d) Catechol (48 g., 0.5 mole), methanol (44 g.) and concentrated hydrochloric acid (20 g.) were mixed together in a 250 ml. flask, stirred and brought to a gentle reflux, when crotonaldehyde (17.5 g., 0.25 mole) was added dropwise over a period of 30 minutes. After the addition the heating was continued for another hour at the end of which the reaction mixture was washed several times with water and the product dried on the steam bath under reduced pressure. The dark gummy residue was heated to 200° C. under high vacuum and the residual gum became solid and brittle on cooling.

(e) Guaiacol (48 g., 0.39 mole), methanol (39 ml.) and concentrated hydrochloric acid (17 ml.) were mixed together and heated to slow reflux. Crotonaldehyde (28 g., 0.4 mole) was slowly added over 20 minutes and the mixture was heated for a further hour. The mixture was cooled, washed with water several times (benzene was added to the organic layer) then with sodium carbonate solution and again with more water. The benzene layer separated, was dried over $Na_2SO_4$ and the benzene removed by evaporation on a steam bath. The residual gum became harder on cooling.

(f) P-octyl phenol (103.5 g., 0.5 mole), methanol (50 ml.) and concentrated hydrochloric acid (21 ml.) were mixed together and brought to a gentle reflux. Crotonaldehyde (35 g., 0.5 mole) was slowly added dropwise to the mixture, and when it was all added heating was continued for another hour. The reaction mixture was washed several times with water. The thick gummy residue was dried under reduced pressure on the steam bath. The residue was distilled up to 200° C., and the remaining dark brown gum became brittle and solid on cooling.

(g) 3-methyl-6-tertiary butyl phenol (82.0 g., 0.5 mole), methanol (50 g.) and concentrated hydrochloric acid (21 g.) were placed in a flask, heated to gentle reflux and stirred when cinnamaldehyde was added drop-wise. When 29.4 g. (0.22 mole) of cinnamaldehyde had been added the reaction mixture became solid. The reaction was stopped and the solid removed, washed well with water, sucked dry and then crystallized from xylene and dried under reduced pressure at 60° C. A good yield of product was obtained, which after one recrystallization from xylene melted at 259–60° C., darkening at 250° C. Crystals of the acetate became transparent at 99° C. but did not melt below 250° C.

*Analysis.*—C, 83.5%; H, 8.9%. $C_{42}H_{54}O_3$ requires: C, 83.1%; H, 9.0%. Acetate has sapon. value 237.

The crotonaldehyde condensate was similarly prepared but is better prepared by the following method:

70 grams (1 gram mole) of crotonaldehyde was added during 1 hour to a mixture of 492 grams (3 gram moles) of 3-methyl-6-tertiary butyl phenol, 285 grams of methanol, and 105 mls. of concentrated hydrochloric acid which was vigorously stirred under reflux. The reflux was continued for approxmiately 15 minutes, and the solid product was then removed, washed several times with water and recrystallized from toluene. The recrystallized product weighed 446 grams, corresponding to 82% theoretical yield based on the assumed formula

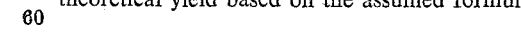

and had a melting point of 180–182° C. The material was recrystallized from petroleum ether (B.P. 80–100° C.) and dried at 100° C. for several hours under high vacuum. The product melted at 188° C. with decomposition. An acetyl derivative was prepared by treating the product with acetic anhydride and sodium acetate, and recrystallized from ethyl alcohol. The recrystallized derivative showed acetyl groups but no hydroxyl radicals on infra-red analysis, and had a melting point of 164° C. A benzoate derivative was also prepared by treating the product with benzoyl chloride in pyridine. In the accompanying table there are given found and theoretical carbon and hydrogen values and molecular and equivalent weights which show that the formula of the product is $C_{37}H_{52}O_3$, in which the oxygen atoms are contained in three hydroxyl groups.

TABLE

| Material | Wt. Percent | | Mol. Weight | Equivalent Weight |
|---|---|---|---|---|
| | C | H | | |
| Product | 81.3 | 9.9 | | |
| $C_{37}H_{49}(OH)_3$ | 81.6 | 9.6 | | |
| Acetyl derivative | 77.1 | 8.6 | 673 | 231 |
| $C_{37}H_{49}(OCOCH_3)_3$ | 77.0 | 8.7 | 670 | 223 |
| Benzoate | 81.2 | 7.6 | | |
| $C_{37}H_{49}(OCOC_6H_5)_3$ | 81.3 | 7.5 | | |

(h) Guaiacol (62 g., 0.5 mole), methanol (50 g.) and concentrated hydrochloric acid (21 g.) were added to the reaction vessel. The mixture was refluxed gently and stirred while cinnamaldehyde (36 g., 0.26 mole) was slowly added (dropwise) over a period of 30 minutes. The mixture was stirred and heated for a further 1 hour. By this time a thick oil had been formed. The reaction mixture was cooled and washed several times with cold water, when the thick gum showed signs of solidifying. The gum was washed with several amounts of hot water, then with a dilute solution of sodium carbonate, and again with hot water and left to stand in water overnight. The gum was partially solid and attempts were unsuccessfully made with several solvents to obtain crystals. The gum was then dried by heating on a steam bath under reduced pressure.

Afterwards it was distilled under high vacuum.
Fractions: 78°/1 mm. (cinnamaldehyde).
The bath temperature was taken up to 230° C. but no further fractions came over. The thick dark resdue became a glass on cooling.

(i) 2,6-dimethyl phenol (61.1 g., 0.5 mole), 30 g. methanol and 21 g. conc. $H_2SO_4$, were mixed together and heated to gentle reflux. Citral 0.25 mole (38.1 g.) was added over a period of a half an hour. The mixture was cooled and washed with water and benzene was then added to make the organic layer easier to work. The benzene solution was steam distilled, and some citral and 2,6-dimethyl phenol came over (about 2 g. of each). The residue was again taken up in benzene, separated from the water, dried over anhydrous sodium sulfate and finally the benzene was removed by evaporation. A dark gum was left which became very thick but did not solidify on standing.

(j) 3-methyl-6-tertiary butyl phenol (37.0 g. 0.23 mole), methanol (25 g.) and concentrated hydrochloric acid (10.5 g.) were mixed together in a stirred reaction vessel and heated to reflux. 1-methylclohexene-4-al (15.4 g. 0.12 mole) was then added drop-wise over 15 minutes, and the heating and stirring continued for 1 hour. By this time a gum had formed. The reaction mixture was cooled and left to stand overnight. It was washed several times with hot water. A cream gum was formed. This was washed several times with hot water, then with dilute sodium carbonate solution and finally with hot water. It showed signs of solidifying so the gum was dried in a vacuum oven at 110° C. for 90 minutes. The thick runny gum became quite solid on cooling. The solid was dissolved in minimum quantity of boiling xylene and then left to cool overnight. The crystals were filtered off and dried in the vacuum oven at 80° C. and 30→10 mm. pressure. Melting point 250–251° C. (darkens at 236° C.). The acetate had a melting point of 176.5–178° C.

(2) *According to the method of Niederl and McCoy, J. Am. Chem. Soc., 63 (1941), 1731*

(a) 2,6-dimethyl phenol (12 g., 0.10 mole), and crotonaldehyde (3.5 g., 0.05 mole) were dissolved in 100 ml. glacial acetic acid. A second solution was prepared containing the same quantity of phenol but twice the quantity of crotonaldehyde. To each of these solutions concentrated hydrochloric acid (20 ml.) was added. When after three days no crystals had separated, dry hydrogen chloride was passed through the solutions, which were left standing for a further two days. A little solid separated out from both the solutions. These were left a further day and were then filtered. The crystals were recrystallized from benzene and dried in a vacuum desiccator. Melting point 197° C. for both samples.

*Analysis.*—Found: C, 79.8%; H, 8.6%; $C_{28}H_{34}O_3$ requires: C, 80.3%; H, 8.2%.

(3) *According to the method of W. Baker, J. Chem. Soc., 1939, p. 1422*

(a) Mesityl oxide (17 g., 0.17 mole), was mixed with 3-methyl-6-tertiary butyl phenol (109 g., 0.62 mole) and dry HCl passed into the mixture for several hours. The flask was cooled initially in ice. The flask was placed in a water bath at 40° C. overnight and more HCl passed in the following day. Thereafter the flask was kept at 40° C. for about 10 days. The reaction mixture was washed twice with boiling water and then ethanol was added in order to try and obtain crystals. After the mixture had stood for several days no crystals had been obtained and the ethanol was removed by evaporation on the steam bath. The liquid reaction mixture was then distilled in vacuo (91° C., 2.5 mm.) to remove unreacted starting materials. The residue (about 1.2 g.) solidified.

(4) *According to the method of McGreal, J. Am. Chem. Soc., 61 (1939), p. 345*

(a) p-octyl phenol (41.4 g., 0.2 mole), 2-cyclo hexenone (10 g., 0.1 mole), glacial acetic acid (40 ml.) were placed in a 500 ml. flask. The reaction flask was provided with a reflux condenser and a gas inlet tube extending to the bottom of the vessel. A vigorous stream of dry HCl gas was passed through the system for 4 hours, during which time the reaction mixture was heated to refluxing. After this the flask was removed, tightly stoppered and left standing overnight. The reaction mixture was washed with water several times then benzene was added to aid separation and the mixture was washed again with water, dilute sodium carbonate solution, and finally water. The benzene layer was separated and dried over anhydrous sodium sulfate. The benzene was removed by boiling and then the residue was vacuum distilled.

Fractions:

104–170° C./0.2 mm. (p-octyl phenol, this solidified)
160–180° C./0.2 mm. a liquid on cooling became a glass
Residue—dark gum—glassy when cool.

(5) *Miscellaneous methods*

(a) 3-methyl-6-tertiary butyl phenol (41 g., 0.25 mole), methanol (25 g.) and concentrated hydrochloric acid (10.5 g.) were mixed in a flask and heated to a gentle reflux. p-Hydroxybenzaldehyde (16.8 g., 0.14 mole) was slowly run into the reaction flask over a period of 15 minutes. The reaction mixture developed a bright red colour. Heating was continued for another hour, by which time crystals had come out of solution. On cooling the white solid was filtered off, washed and recrystallized from glacial acetic acid. This gave a small amount (about 2 g.)

of large crystals (1), but most of the crystalline mass remained in solution. The mother liquor was heated to boiling and water slowly added until the turbidity point was reached. The solution was left to stand at room temperature overnight. The crystals (2) were filtered off and dried in the vacuum oven at 60° C. Water was added to the reaction mixture. This caused a large amount of solid to come out of solution which was recrystallized (3) from glacial acid, filtered and dried in a vacuum oven at 60° C. Samples (1), (2) and (3) all melted at 258° C. giving a dark red liquid. D. J. Beaver and P. J. Staffel (J. Amer. Chem. Soc. 74, 3410, 1952) giving melting point 262–263° (from glacial acetic acid).

*Analysis (Sample 2)*.—Found: C, 80.8%; H, 8.6%. $C_{29}H_{36}O_3$ requires: C, 80.5%; H, 8.4%.

Analytical figures for the acetate were in agreement with this formula.

(b) Phenol (94 g., 1 mole), methanol (40 g.) and concentrated hydrochloric acid (17 g.) were mixed together in a flask, stirred and gently refluxed. To the mixture crotonaldehyde (14 g., 0.2 mole) was slowly added, after which the mixture was stirred and heated for a further hour. Hot water was then added and the reaction mixture formed two layers. On further vigorous stirring with hot water the organic layer became a thick gum. Finally this was dried on the steam bath under reduced pressure to give a brittle mass. Unsuccessful attempts were made to crystallize this solid from petroleum ether (B.P. 100–120° C.), xylene, ethanol, and glacial acetic acid.

(c) 3-methyl-6-tertiarybutyl phenol (82 g., 0.5 mole), methanol (50 g.) and concentrated hydrochloric acid (21 g.) were placed together in a flask and brought to gentle reflux. Crotonaldehyde dimer (38.5 g., 0.275 mole) was added slowly over 30 minutes with stirring. Water was then added to the reaction mixture, stirred and the aqueous layer separated. The gum was washed in this manner several times with hot water. On cooling the gum became a brittle black solid, which was crushed into a powder and dried in a desiccator under reduced pressure and over concentrated sulfuric acid.

(d) 3-methyl-6-tertiary butyl phenol (40.2 g., 0.3 mole) and 6.9 g. of methyl vinyl ketone (6.9 g., 0.1 mole) were mixed together and dry HCl blown into the ice cold mixture for several hours. The flask was then placed in a constant temperature bath at 40° C. for 6 days, and the reaction mixture was then worked up by washing the black gum several times with hot water and finally drying it on the steam bath under reduced pressure. The residue was distilled under high vacuum.

Fractions:

60–70°/0.1 mm.
120–125°/0.1 mm.

The second portion became solid on cooling and was recrystallized from xylene. It was dried overnight in the vacuum oven.

*Analysis*.—C, 77.1%; H, 9.6%. A 1:1 condensate $(C_{15}H_{22}O_2)$ requires: C, 76.9%; H, 9.4%. Melting point, 113° C.

The crystals and residue were sent for testing.

(e) Dibenzal acetone (23.4 g., 0.1 mole), catechol (22.0 g., 0.2 mole), and the minimum of glacial acetic acid to dissolve them, were mixed in a flask and concentrated hydrochloric acid (7 ml.) added, upon which the mixture became dark red. The flask was stoppered and left to stand for two days, during which time no crystals were deposited. Dry HCl was then passed into the solution for several hours and the mixture was heated on the steam bath overnight. The mixture was poured into water and the solid filtered, washed and dried in vacuo over concentrated sulfuric acid. A brown solid (31 g.) was obtained.

(g) Dibenzal acetone (23.6 g., 0.1 mole), and cresol (21.6 g., 0.2 mole) were mixed together with glacial acetic acid (25 ml.) and concentrated hydrochloric acid (19 ml.) and placed on the steam bath for 5 days. The reaction mixture was poured into water and digested several times with hot water and finally dried on the steam bath under reduced pressure. Acetic anhydride (60 ml.) and pyridine (2 ml.) were added to the flask which was heated on the steam bath overnight, the mixture being finally refluxed for 5 hours. Water (40 ml.) and ethanol (30 ml.) were added to the hot mixture. The solution on cooling deposited a dark gum which after separation was hydrolyzed with potassium hydroxide and reprecipitated on acidification with hydrochloric acid. The resulting gum was dried.

(6) *Thiodialkanoic acid derivatives were prepared as follows:*

(a) *N,N'-dilauryl thiodipropionamide*.—Thionyl chloride (50 ml.) was added slowly to β-thiodipropionic acid (25 g.) so that no great amount of heat was evolved. The mixture was then refluxed for 1 hour the acid gradually dissolving in the thionyl chloride to give the acid chloride with the evolution of HCl. The unchanged thionyl chloride was distilled off at 74° C. The acid chloride was distilled off under nitrogen using an oil bath and a rotary oil pump. A yellowish oily product boiling at 125–130° C. at a pressure of 5 mm. of mercury was obtained. Yield 15 ml., density 1.3 g./cc. Dodecylamine (13.7 g., 4 moles) was dissolved in methylene chloride (150 ml.). To this stirred solution a 10% solution of the β-thiodipropionyl chloride (4 g., 3 ml.—1 mole) was added slowly over 30 minutes. The white precipitate which formed was filtered off, washed with large quantities of dilute HCl to remove dodecylamine and dodecylamine hydrochloride and was finally boiled with methylene chloride to remove the last traces of unchanged dodecylamine. It was filtered, washed with methylene chloride and finally with methanol and dried. Melting point 118° C.

(b) *N,N,N',N' - tetrahexyl thiodipropionamide*.—Di-n-hexylamine (a liquid—4.6 g., 2 moles) was weighed and dissolved in methylene chloride (30 ml.) to which pyridine (2 g., 2 moles) was added. Thiodipropionyl chloride (2 ml., 2.6 g., 2 moles) mixed with methylene chloride (20 ml.) was added slowly with stirring. The mixture was refluxed for 1 hour, removed from the flask and allowed to stand to evaporate off the methylene chloride. The resultant oily liquid was washed many times with dilute hydrochloric acid to remove pyridine as the hydrochloride in addition to any unreacted acid chloride and secondary amine. The product was dried by dissolving in a little methylene chloride and separating from the water and allowing the methylene chloride to evaporate. The product was a yellow sticky solid.

(c) *Dilaurylthiodipropionate*.—Thiodipropionic acid (5 g.), lauryl alcohol (10.4 g.), sulfuric acid (0.5 ml.), and benzene (100 ml.) were refluxed, with stirring, in a 500 ml. 3-necked flask on which was fitted a Dean and Stark separator until the calculated amount of water had been collected. The reaction mixture was then poured into excess water. On attempting to separate the benzene layer, an emulsion formed which was difficult to break up. The difficulty was, however, overcome by placing the mixture in a liquid-liquid extractor and continuously extracting with benzene. The benzene extract was evaporated to dryness to give an oily product (wt.=13.8 grams). This was recrystallized from ethanol, yielding a powdery white compound.

Melting point, 31–33° C. Recrystallized once more from ethanol: melting point, 38.5–40.4° C. Recrystallized again: melting point, 38° C. Final weight of product, 7.8 grams.

(d) *Distearyl thiodipropionate* was prepared by the method already described for the dilauryl ester starting from: thiodipropionic acid (5 g.), stearyl alcohol (15.2 g.), sulfuric acid (0.5 ml.), and benzene (150 ml.). Weight of crude diester, 19.7 g. Recrystallized from alcohol: melting point, 52–55° C. Recrystallizing from alcohol: melting point, 54–55° C.

(e) *Dilaurylthiodibutyrate* was similarly prepared from: thiodibutyric acid (5 g.), lauryl alcohol (9 g.), sulfuric acid (0.5 ml.), and benzene (100 ml.). Weight of crude diester, 13.2 grams. Melting point, 30–34° C.

After one recrystallization the melting point was unchanged (yield, 7.8 g.). After three recrystallizations the melting point was 31–32° C. (yield 4.6 g.).

(f) *Dilaurylthiodiglycollate* was similarly prepared from: thiodiglycollic acid (5 g.), lauryl alcohol (12.4 g.), sulfuric acid (0.5 ml.), and benzene (100 ml.); (g) thiodipropionic acid (10 g.), cinnamyl alcohol (15 g.), sulfuric acid (0.5 ml.), and benzene (100 ml.) were refluxed with stirring in a 250 ml. flask fitted with a Dean and Stark separator until the calculated amount of water of esterification had been collected. The benzene solution was then washed free of acid, first with dilute sodium hydroxine (4% solution) and then with water (some trouble was experienced with emulsions, but treatment with sodium chloride and ether cleared them), after which it was dried over sodium sulfate, and the benzene was distilled off. The crude ester was obtained as an oil which did not crystallize. Yield, 18 grams.

(h) *Dibenzylthiodipropionate* was prepared from: thiodipropionic acid (10 g.), benzyl alcohol (12.1 g.), sulfuric acid (0.5 ml.), and dry benzene (100 ml.). The experimental technique was as described for the preparation of the dicinnamyl ester. Product was again an oil. Yield, 13 g.

(i) *Preparation of dicyclohexylthiodipropionate.*—Thiodipropionic acid (10 g.), cinnamyl alcohol (18.2 g.), sulfuric acid (0.5 ml.), and dry benzene (100 ml.). Yield, 18 g.

EXAMPLE I

Polyethylene of melt flow index 2 (as measured by the A.S.T.M. method) was mixed with various thiodialkanoic acid derivatives and various phenol condensates, as set out in the following table, by milling these ingredients together at 140° C. The compositions produced were pressed at 150° C. into sheets of 1/50, 1/100, 5/1000 and 1/200 of an inch thick. Small samples of the 1/200 of an inch pressing were placed on glass wool in a glass bulb which contained some Type 5A "Linde" (registered trademark) molecular sieves to absorb gaseous products of oxidation and which was connected by a U-tube containing mercury to another glass bulb. ("Linde" molecular sieves are synthetic zeolites.) Both bulbs were filled with air, then sealed and the apparatus placed in a vapor thermostat at 140° C. Movement of the mercury indicated oxidation of the polyethylene and the time in the vapor thermostat at 140° C. until a notable rate of movement of the mercury was apparent was measured. Samples of an inch long by 7/8 of an inch wide cut from the 5/1000 of an inch thick sheet were placed on microscope slides in an air oven at 140° C. Samples were removed at intervals and the extent of oxidation was estimated by measuring carbonyl group concentration by infra-red spectroscopy using the absorption band at 5.85 microns wavelength. The time before the oxygen present as carbonyl was greater than 0.1% was measured. The oven-aging tests at 160° C. were carried out similarly except that the time taken to reach a carbonyl concentration of 0.4% was measured and the samples were 1/100 of an inch thick.

The results obtained are set out in Tables 1 and 2.

COMPARISON EXPERIMENTS

| Phenol Condensation Product | | Dilauryl thiodipropionate, percent by weight | Oxidation induction period at 140° C. in hours |
|---|---|---|---|
| Nature | Quantity, percent by weight | | |
| -------- | 0 | 0 | 2½ |
| -------- | 0 | 0.1 | 40 |

TABLE 1
[For abbreviations see after Table 4]

| Thiodialkanoic acid derivative | Percent | Phenolic Compound | Percent | Induction period, hours at 140° C. | | Hours at 160° C. Oven Ageing |
|---|---|---|---|---|---|---|
| | | | | Oxygen Uptake | Oven Ageing | |
| A — Dilauryl thiodipropionate | 0.1 | 3M6B/3 methyl hexanaldehyde | 0.1 | 320 | 220 | Ca. 40 |
| ---do--- | 0.1 | 3M6B/iso octanaldehyde | 0.1 | 330 | 340 | |
| ---do--- | 0.1 | 3M6B/nonaldehyde | 0.1 | 300 | 220 | Ca. 40 |
| ---do--- | 0.1 | 3M6B/decanaldehyde | 0.1 | 270 | 280 | |
| ---do--- | 0.1 | Phenol/acetophenone | 0.1 | 170 | 30 | |
| ---do--- | 0.1 | 3M6O/iso octanaldehyde | 0.1 | 530 | 220 | |
| ---do--- | 0.1 | 3M6O/nonaldehyde | 0.1 | 370 | 210 | 90 |
| B — Dilauryl thiodipropionate | 0.1 | 3M6O/3 methyl hexanaldehyde | 0.1 | 190 | 120 | |
| ---do--- | 0.1 | 3M6B/acetophenone | 0.1 | 90 | 8–16 | |
| ---do--- | 0.1 | 2M6M/benzaldehyde | 0.1 | 390 | 60 | |
| ---do--- | 0.1 | Phenol/dibenzyl ketone | 0.1 | 90 | 10 | |
| ---do--- | 0.1 | 3M6B/p-hydroxybenzaldehyde | 0.1 | 780 | 280 | |
| ---do--- | 0.1 | 2O4OMe/methyl cyclohexanone | 0.1 | 150 | 30 | |
| ---do--- | 0.1 | p-Octyl phenol/nonaldehyde | 0.1 | 180 | 80 | |
| ---do--- | 0.1 | Styrenated phenol/acetophenone 138–142° C. at 0.6 mm. | 0.1 | 140 | 25 | |
| ---do--- | 0.1 | Styrenated phenol/acetophenone residue. | 0.1 | 90 | 15 | |
| Distearyl thiodipropionate | 0.1 | 3M6B/nonaldehyde | 0.1 | 280 | 100 | |
| Dicinnamyl thiodipropionate | 0.1 | ---do--- | 0.1 | 140 | 45 | |
| Dibenzyl thiodipropionate | 0.1 | ---do--- | 0.1 | 200 | 35 | |
| Dicyclohexyl thiodipropionate | 0.1 | ---do--- | 0.1 | 160 | 20 | |
| Dilauryl thiodiglycollate | 0.1 | 3M6B/3 methylhexanal | 0.1 | 130 | 20 | |
| Dilauryl thiodibutyrate | 0.1 | ---do--- | 0.1 | 210 | 25 | |
| Dilauryl thiodipropionate | 0.5 | 3M6B/iso octanaldehyde | 0.1 | 990 | 450 | |
| ---do--- | 0.1 | ---do--- | 0.5 | 440 | 250 | |
| ---do--- | 0.5 | ---do--- | 0.5 | 2,100 | 600 | |

None of these phenols give appreciable staining in polythene at these concentrations with the exception of those which were brown to start with (e.g. the styrenated compounds) and the 3M6B/p-hydroxybenzaldehyde compound.

TABLE 2

| | Thiodialkanoic acid derivative | Percent | Phenolic Compound | Percent | Induction period, hours at 140° C. Oxygen Uptake | Induction period, hours at 140° C. Oven Ageing | Hours at 160° C. Oven Ageing |
|---|---|---|---|---|---|---|---|
| A | None | | 3M6B/crotonaldehyde | 0.1 | 60 | 70 | |
| | do | | 3M60/crotonaldehyde | 0.1 | — | 60 | |
| | Dilauryl thiodipropionate | 0.1 | 3M6B/crotonaldehyde | 0.1 | 310 | 270; 325; 450 | 140; 150; 160 |
| | do | 0.1 | 3M60/crotonaldehyde | 0.1 | 330 | 250 | 115 |
| B | Dilauryl thiodipropionate | 0.1 | Catechol/crotonaldehyde* | 0.1 | 80 | 50 | |
| | do | 0.1 | p-Octyl phenol/crotonaldehyde* | 0.1 | 95 | 100 | |
| | do | 0.1 | Guaiacol/crotonaldehyde* | 0.1 | 125 | 35 | |
| | do | 0.1 | 3M6B/1-methylcyclohexene-4-al | 0.1 | 520; 420 | 340; 280 | |
| | do | 0.1 | Guaiacol/cinnamaldehyde* | 0.1 | 300 | 230 | |
| | do | 0.1 | p-Octyl phenol/cyclohexenone (residue) | 0.1 | 50 | 8–16 | |
| | do | 0.1 | p-Octyl phenol/cyclohexenone | 0.1 | 18 | 8–16 | |
| | do | 0.1 | 3M6B/mesityl oxide | 0.1 | 530 | 290 | |
| | do | 0.1 | 2M6M/crotonaldehyde | 0.1 | 560 | 280 | |
| | do | 0.1 | 3M6B/cinnamaldehyde | 0.1 | 710 | 370 | |
| | do | 1.1 | 3M6B/methacrolein dimer | 0.1 | Ca.480 | Ca.240 | |
| | do | 0.1 | Catechol/dibenzal acetone* | 0.1 | 100; 110 | 220 | |
| | do | 0.1 | 2M6M/citral | 0.1 | — | 260 | |
| | do | 0.1 | 3M6B/acrolein | 0.1 | 330 | 340 | |
| | do | 0.1 | 3M6B/methacrolein | 0.1 | 590 | 360 | |
| | do | 0.1 | O-cresol/dibenzalacetone* | 0.1 | 70 | 35 | |
| | do | 0.1 | Phenol/crotonaldehyde* | 0.1 | 370 | 310 | |
| | do | 0.1 | 2M6M/acrolein* | 0.1 | 75; 100 | Ca.250 | |
| | do | 0.1 | 3M6B/crotonaldehyde dimer | 0.1 | 610 | Ca.320 | |
| | do | 0.1 | 3M6B/methyl vinyl ketone | 0.1 | 20 | 8–16 | |
| | do | 0.1 | 3M6B/methyl vinyl ketone (residue) | 0.1 | — | 310 | |
| | Distearyl thiodipropionate | 0.1 | 3M6B/crotonaldehyde | 0.1 | — | 380 | |
| | Dilauryl thiodiglycollate | 0.1 | do | 0.1 | 140 | 90 | |
| | Dilauryl thiodibutyrate | 0.1 | do | 0.1 | 620 | 340 | |
| | Isooctylthiodibutyrate (Plastomoll TAH) | 0.1 | do | 0.1 | — | 85 | |
| | Dicinnamyl thiodipropionate | 0.1 | do | 0.1 | 140 | 105 | |
| | Dibenzyl thiodipropionate | 0.1 | do | 0.1 | 200 | 70 | |
| | Dicyclohexyl thiodipropionate | 0.1 | do | 0.1 | 110 | 65 | |
| | Dilauryl thiodipropionate | 0.01 | do | 0.01 | 11 | 8–16 | |
| | do | 0.5 | do | 0.1 | — | 630 | |
| | do | 0.1 | do | 0.5 | — | 390 | |
| | Dilauryl thiodipropionamide | 0.1 | do | 0.1 | 430 | 270 | |
| | N,N,N',N'-tetrahexyl thiodipropionamide | 0.1 | do | 0.1 | 220 | 200 | |

*This indicates that incompatibility of the phenol is suspected, either because of irreproducibility of results or because of blooming from the polymer or undispersed specks. It should be noted that most of these phenols lack a large alkyl group which might confer solubility in the polymer.

EXAMPLE II

Polypropylene of melt flow index 5 (as measured by the A.S.T.M. method modified by using a 10 kg. weight instead of that specified for causing extrusion) was mixed on open rolls at 165° C. with thiodialkanoic acid derivatives and various phenol condensates, as set out in the following table. Thin sheets about 1/50 of an inch thick were prepared by molding at 190° C. from each of the compositions obtained. These sheets were held in an air oven at 140° C. until they were found to be brittle when handled. The results of these tests were as follows:

COMPARISON EXPERIMENTS

| Thiodipropinate Compound | Percent | Phenolic Compound | Percent | 140° brittle time (hours) |
|---|---|---|---|---|
| None | | None | | 5 |
| Dilauryl thiodipropionate | 0.5 | do | | 50 |
| None | | 3M6B/crotonaldehyde | 0.25 | 60 |
| Do | | do | 0.5 | 125 |

TABLE 3

| Thio-Compound | Percent | Phenolic Compound | Percent | 140° brittle time (hrs.) | Staining On Milling | Staining In U.V. |
|---|---|---|---|---|---|---|
| Dilauryl thiodipropionate | 0.5 | 3M6B/nonanal | 0.5 | 670 | Nil | Good. |
| Do | 0.5 | 3M6B/decanal | 0.5 | 860 | Nil | Do. |
| Do | 0.5 | 3M60/3-methyl hexanal | 0.5 | 740 | Nil | Do. |
| Do | 0.5 | 3M60/iso-octanal | 0.5 | 575 | Nil | Do. |
| Do | 0.5 | 3M60/nonanal | 0.5 | 525 | Nil | Do. |
| Do | 0.5 | 3M6B/3 methyl hexanal | 0.5 | 385 | Nil | Do. |
| Do | 0.5 | 3M6B/isooctanal | 0.5 | 605 | Nil | Do. |
| Do | 0.5 | p-Octyl phenol/nonanal | 0.5 | 500 | Nil | — |
| Do | 0.5 | 2.6 dimethyl phenol/benzaldehyde | 0.5 | 530 | Orange | — |
| Do | 0.5 | 3M6B/p.hydroxy benzaldehyde | 0.5 | 750 | Grey | Bad. |
| Do | 0.5 | Phenol/dibenzyl ketone | 0.5 | 365 | V. pale brown | Poor. |
| Do | 0.5 | 3M6B/acetophenone | 0.5 | 530 | V. pale brown | — |
| Do | 0.5 | Styrenated phenol/acetophenone | 0.5 | 410/650 | Nil | Fair. |
| Do | 0.5 | 2.octyl.4.methoxy phenol/methyl cyclohexanone | 0.5 | 380 | Pale brown | Good. |
| Distearyl thiodipropionate | 0.5 | 3M6B/nonanal | 0.5 | 2500 | Nil | Do. |
| Dibenzyl thiodipropionate | 0.5 | do | 0.5 | 100 | Nil | Fair. |
| Dicinnamyl thiodipropionate | 0.5 | do | 0.5 | 335 | Nil | Do. |
| Dicyclohexyl thiodipropionate | 0.5 | do | 0.5 | 75 | Nil | Do. |
| Dilauryl thiodipropionate | 0.1 | do | 0.1 | 240 | Nil | Good. |
| Do | 0.25 | do | 0.25 | 480 | Nil | Do. |
| Do | 0.5 | do | 0.5 | 815 | Nil | Do. |
| Do | 1.0 | 3M6B/nonaldehyde | 1.0 | 960 | Nil | Fair. |
| Do | 0.5 | do | 0.25 | 525 | Nil | Good. |
| Do | 0.25 | do | 0.5 | 645 | Nil | Do. |

TABLE 4

| Thio-Compound | Percent | Phenolic Compound | Percent | 142° brittle time (hrs.) | Staining On Milling | Staining In U.V. |
|---|---|---|---|---|---|---|
| Dilauryl thiodipropionate | 0.5 | 3M6B/crotonaldehyde | 0.5 | 670 | Nil | Good. |
| Do | 0.5 | 3M6O phenol/crotonaldehyde | 0.5 | 880 | Nil | Do. |
| Do | 0.5 | 2,6 dimethyl phenol/acrolein | 0.5 | 530 | Nil | Do. |
| Do | 0.5 | 3M6B/acrolein | 0.5 | 765 | Nil | Do. |
| Do | 0.5 | 4-t. butyl phenol/methacrolein | 0.5 | 360 | Nil | Do. |
| Do | 0.5 | 3M6B/methacrolein | 0.5 | 575 | Nil | Good. |
| Do | 0.5 | 3M6B/methacrolein dimer | 0.5 | 575 | Nil | Do. |
| Do | 0.5 | Phenol/crotonaldehyde | 0.5 | 525 | →Pale Purple | Poor. |
| Do | 0.5 | 2,6 dimethyl phenol/crotonaldehyde | 0.5 | 675 | Nil | Fair. |
| Do | 0.5 | Catechol/crotonaldehyde | 0.5 | 450 | →Black | — |
| Do | 0.5 | Guaiacol/crotonaldehyde | 0.5 | 670 | →Brown | — |
| Do | 0.5 | p-Octyl phenol/crotonaldehyde | 0.5 | 670 | →Pale Yellow | Good. |
| Do | 0.5 | 3M6B/crotonaldehyde dimer | 0.5 | 460 | Nil | — |
| Do | 0.5 | 3M6B/cinnamaldehyde | 0.5 | 795 | →Pale Pink | Good. |
| Do | 0.5 | Guaiacol/cinnamaldehyde | 0.5 | 500 | →Orange | — |
| Do | 0.5 | 2,6 dimethyl phenol/citral | 0.5 | 670 | →Pale Yellow | Good. |
| Do | 0.5 | 3M6B/1-methyl cyclohexene 4-al | 0.5 | 600/625 | Nil | Do. |
| Do | 0.5 | 3M6B/methyl vinyl ketone (residue) | 0.5 | 575 | | |
| Do | 0.5 | Catechol/dibenzal acetone | 0.5 | 720 | →Nigger Brown | — |
| Do | 0.5 | O.cresol/dibenzal acetone | 0.5 | 500 | →Pale Yellow | Poor. |
| Do | 0.5 | 3M6B/mesityl oxide | 0.5 | 625 | →Pale Brown | Good. |
| Do | 0.5 | p.Octyl phenol/cyclohexenone | 0.5 | 335/695 | Nil | Do. |
| Distearyl thiodipropionate | 0.5 | 3M6B/crotonaldehyde | 0.5 | 1730 | Nil | Do. |
| Dibenzyl thiodipropionate | 0.5 | ...do | 0.5 | 310 | Nil | Fair. |
| Dicinnamyl thiodipropionate | 0.5 | ...do | 0.5 | 335 | Nil | Do. |
| Dicyclohexyl thiodipropionate | 0.5 | ...do | 0.5 | 365 | Nil | Do. |
| Dilauryl thiodipropionate | 0.1 | ...do | 0.1 | 50 | Nil | Good. |
| Do | 0.25 | ...do | 0.25 | 550 | Nil | Do. |
| Do | 0.5 | ...do | 0.5 | 815 | Nil | Do. |
| Do | 1.0 | ...do | 1.0 | 1100 | Nil | Do. |
| Do | 0.5 | ...do | 0.25 | 645 | Nil | Do. |
| Do | 0.25 | ...do | 0.5 | 645 | Nil | Do. |
| Dilauryl thiodiglycollate | 0.5 | ...do | 0.5 | 480 | Nil | Do. |
| Dilauryl thiodibutyrate | 0.5 | ...do | 0.5 | 1180 | Nil | Do. |
| N,N' dilauryl thiodipropionamide | 0.25 | ...do | 0.25 | 400 | Nil | Do. |
| N,N,N',N', tetrahexyl thiodipropionamide | 0.25 | ...do | 0.25 | 265 | Nil | Do. |

Samples 1/50 of an inch thick and 1½-inch long by ½-inch wide of the above mixtures of additives giving stabilized compositions in polyethylene and polypropylene were held for 24 hours 10 cms. from a 500-watt high pressure mercury arc Hanovia S 500 source of ultraviolet light, screened by ½-mm. Pyrex cutting-out light of less than 2850 A. and the degree of staining recorded qualitatively.

*Abbreviations*

In Tables 1 to 4, the following abbreviations have been used:

3M6B—3-methyl-6-tertiary butyl phenol
3M6O—3-methyl-6-tertiary octyl phenol
2M6M—2,6-xylenol
2O4OMe—2-octyl-4-methoxy phenol

EXAMPLE III

*Nitrile rubbers*

Antioxidants were incorporated into nitrile rubber by milling for a few minutes on cold rolls. The oxidation resistance of the resulting crepes was measured by oxygen uptake as in Example I but at 78° C. instead of 140° C.

*Results*

Antioxidant system: Induction period, hours at 78° C.
None _____ 10
Dilaurylthiodipropionate (LTPA) (1%) ____ 10
3M6B/crotonaldehyde (1%) _____ 140
3M6B/3 methylhexanal (1%) _____ 220
LTPA+1% 3M6B/crotonaldehyde (1%) ___ 860
LTPA+1% 3M6B/3 methyl hexanal (1%) __ 1000

EXAMPLE IV

*Poly-3-methylbut-1-ene*

Poly-3-methylbut-1-ene made with a catalyst (microash 0.8%) was mixed with a 1% solution of a 50/50 mix of dilauryl thiodipropionate (LTPA) and 3M6B/crotonaldehyde in acetone such that 1% total of antioxidant was added to the polymer. More acetone was added to make up a homogeneous slurry. The acetone was removed by passing a stream of nitrogen through this slurry and the last traces by drying in a vacuum oven. This was repeated using dilauryl thiodipropionate and 3M6B/nonaldehyde. These two samples together with a nitrogen-filled degassed sample of the original polymer were compacted to 5/1000 of an inch by pressing at 200° C. using 10 tons per sq. in. pressure and were tested for oxidation resistance by oxygen uptake at 140° C. as in Example I.

RESULTS

| Sample | Antioxidant System | Induction Period, hours at 140° C. |
|---|---|---|
| OD/60/0228 | None | 1 |
| OD/60/0228 | 0.5% LTPA, 0.5% 3M6B/crotonaldehyde | 90 |
| OD/60/0228 | 0.5% LTPA, 0.5% 3M6B/nonaldehyde | 80 |

The antioxidants were not easily dispersed in this polymer.

In all the above examples a dash indicates that the experiment was not carried out.

Replicates are separated by semicolons. Results from tests on different fractions are separated by oblique strokes, the residue being given last.

What is claimed is:

1. A polymeric composition comprising a solid polymer of an aliphatic mono-alpha olefin and a stabilizer composition comprising as the sole essential anti-oxidants,
    (1) a thio compound selected from the group consisting of diesters of a monohydric aliphatic alcohol having from 10 to 20 carbon atoms and of a thiodialkanoic acid and
    (2) a phenolic compound having the formula

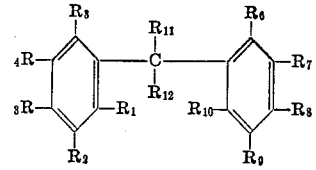

in which at least one of $R_1$, $R_3$ and $R_5$ and at least one of $R_6$, $R_8$ and $R_{10}$ is a hydroxyl group, the remaining nuclear substituents being selected from the class consisting of hydrocarbon and hydrogen atoms, and in which $R_{11}$ and $R_{12}$ comprise at least one hydroxyaryl group and $R_{11}$ and $R_{12}$ being selected from the class consisting of hydrocarbon groups having as a substituent a hydroxyaryl group and hydrogen atoms, the said polymeric composition containing from 0.001 to 5% by weight of the said phenolic compound and from 0.1 to 1 molecules of the said diester to each phenolic hydroxyl group present in the said phenolic compound.

2. A polymeric composition as set forth in claim 1 in which said thio compound is dilauryl thiodipropionate.

3. A polymeric composition as set forth in claim 1 in which said thio compound is distearyl thiodipropionate.

4. A polymeric composition as set forth in claim 1 in which said thio compound is dilauryl thiodibutyrate.

5. A polymeric composition as set forth in claim 1 in which said phenolic compound has the formula

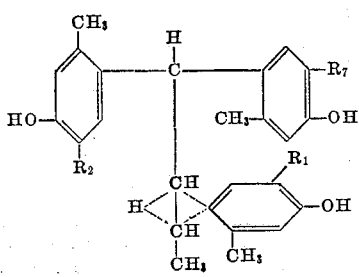

in which $R_2$, $R_7$ and $R_{14}$ are tertiary butyl.

6. A polymeric composition as set forth in claim 1 in which said phenolic compound has the formula:

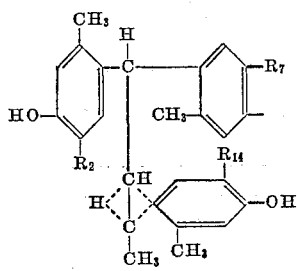

in which $R_2$, $R_7$ and $R_{14}$ are tertiary octyl.

7. A polymeric composition as set forth in claim 1 in which said phenolic compound has the formula

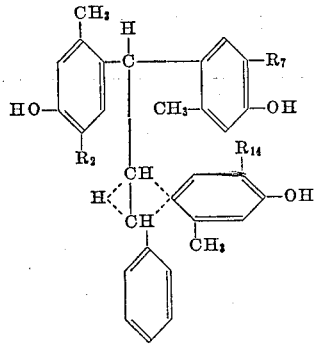

in which $R_2$, $R_7$ and $R_{14}$ are tertiary butyl.

8. A polymeric composition as set forth in claim 1 in which said phenolic compound has the formula

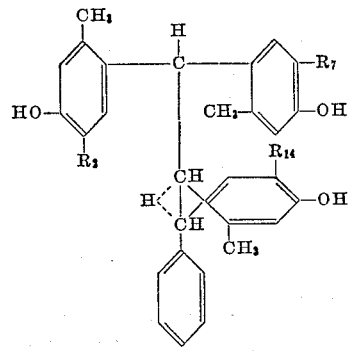

in which $R_2$, $R_7$ and $R_{14}$ are tertiary octyl.

9. A polymeric composition as set forth in claim 1 in which the weight of the phenolic compound is from 0.002 to 0.1% by weight of the polymeric composition.

10. A polymeric composition as set forth in claim 1 in which said solid olefin polymer is a solid polymer of an olefin containing at least three carbon atoms and in which the weight of phenolic compound is from 0.2 to 1% by weight of the polymeric composition.

References Cited
UNITED STATES PATENTS

| | | | |
|---|---|---|---|
| 2,981,717 | 5/1961 | Boultbee | 260—45.85 |
| 3,181,971 | 5/1965 | Rayner | 260—45.9 |
| 3,196,185 | 7/1965 | Ranson | 260—45.95 |

DONALD E. CZAJA, *Primary Examiner.*

LEON J. BERCOVITZ, *Examiner.*

V. P. HOKE, G. W. RAUCHFUSS, *Assistant Examiners.*